United States Patent
Carlsen

[11] 3,834,786
[45] Sept. 10, 1974

[54] METHOD AND APPARATUS FOR RECORDING AND PROJECTING HOLOGRAMS

[75] Inventor: W. John Carlsen, New York, N.Y.

[73] Assignee: General Telephone of Electronics Laboratories Incorporated, New York, N.Y.

[22] Filed: May 1, 1972

[21] Appl. No.: 249,324

[52] U.S. Cl............................ 350/3.5, 350/162 SF
[51] Int. Cl. ......................................... G02b 27/00
[58] Field of Search ...................... 350/3.5, 162 SF

[56] References Cited
UNITED STATES PATENTS

| 755,983 | 3/1904 | Wood............................ 350/162 SF |
| 3,442,566 | 5/1969 | Forward et al. ..................... 350/3.5 |
| 3,497,701 | 2/1970 | Dalton ............................. 350/212 |
| 3,561,839 | 2/1971 | McClung et al. .................... 350/3.5 |
| 3,603,682 | 9/1971 | Sheridon........................... 350/3.5 |
| 3,669,673 | 6/1972 | Chung-Sen-Ih ................. 350/162 X |
| 3,695,744 | 10/1972 | Clay................................. 350/3.5 |

FOREIGN PATENTS OR APPLICATIONS

| 11,466 | 0/1899 | Great Britain................. 350/162 SF |

OTHER PUBLICATIONS

Klimenko et al., Optics & Spectroscopy, Vol. 26, No. 6, June 1969, pp. 552–555.
Mandel, Jour. of the Optical Society of America, Vol. 55, No. 12, Dec. 1965, pp. 1697–1698.
Friesem & Fedorowicz: Recent Advances in Multicolor Wavefront Reconstruction, Applied Optics 5:1085–1086, June 1966.
"GCO 400 Spatial Filter"–an advertising leaflet received April 19, 1971, in Group 250, 1 page GCO Inc. of Ann Arbor, Michigan 48104.
Rosen: Holograms of the Aerial Image of a Lens, Proc. of IEEE, Jan. 1967, p. 79, 80.
Kock & Rosen: Focused–Image Holography–a Method of Restoring the Third Dimension... etc., Proc. of IEEE, Jan. 1967, p. 80, 81.

*Primary Examiner*—Ronald J. Stern
*Attorney, Agent, or Firm*—Irving M. Kriegsman

[57] ABSTRACT

A method and apparatus for recording and projecting single color or multiple color encoded image-plane carrier holograms are described. An object is illuminated with a coherent collimated laser beam. The parallel spatially modulated rays are focused on a monochrome recording medium located in a recording plane with the rays maintained essentially parallel. A collimated reference beam, which is coherent with the object beam, is directed at the recording medium to form an image-plane hologram having a single discrete spatial carrier frequency in case of a single color laser or additional spatial carrier frequencies for as many colors as are in the laser. The processed image-plane hologram is projected by directing a generally collimated beam of incoherent white light upon the hologram to form separated wavefront reconstructions of parallel rays. A lens projects the parallel rays in a viewing plane after their convergence at a focal spot in a focal plane. A spatial filter located in the focal plane provides selection of desired color images and blocks undesired ghosts. A control for moving and adjustment of the spatial filter is provided to attain hue and saturation control as well as brightness of the projected image. An embodiment for recording of image-plane holograms of diffuse objects or diffusely illuminated objects as well as three-dimensional objects is described.

3 Claims, 5 Drawing Figures

PATENTED SEP 10 1974

METHOD AND APPARATUS FOR RECORDING AND PROJECTING HOLOGRAMS

BACKGROUND OF THE INVENTION

This invention relates to a method and apparatus for recording and projecting holographic images. More specifically, this invention relates to a method and apparatus for recording color encoded holograms and projecting color images therefrom.

A hologram is a recording on a medium, such as a photographic plate, of an interference pattern formed by an object light beam and a reference light beam. The object beam, which is usually coherent laser light from an object, is brought into interference with a reference beam usually derived from the laser used to illuminate the object. In conventional holograms, the interference pattern includes three-dimensional information which enables one to obtain different perspectives from the projection or reconstruction of a recorded hologram.

Conventional holography, also known as "unfocused" or "lensless" holography, records each object point redundantly a great number of times and contributes information across the entire surface of the hologram recording film. As a result, each reconstructed wavefront contains full three-dimensional information to enable one to observe a range of perspectives of the object. The reconstruction or projection of conventional unfocused holograms requires coherent light illumination.

When an object of essentially two-dimensional character, such as a transparency, is focused by a lens before impinging on a holographic recording film exactly placed in the image plane of the lens, then the recording is nonredundant. In such case, each hologram element records one and only one image element as in normal photography. The reconstruction of such "focused" or "image-plane" hologram usually does not need a laser and an extended source of white light can be used. See, for example, the article by Gerald B. Brandt entitled "Image Plane Holography" published in Applied Optics, volume 8 page 1421 (July, 1969).

Another technique known as "carrier frequency photography" for recording spatial frequency-encoded images which may be viewed without a laser is described in an article by Peter F. Mueller entitled "Linear Multiple Image Storage" published in Applied Optics, volume 8, page 267 February, 1969). This technique is also useful in forming color encoded photographs as described in another article by Peter F. Mueller entitled "Color Image Retrieval From Monochrome Transparencies" published in Applied Optics, volume 8, page 2,051 (October, 1969).

The "carrier frequency photography" technique in practice encounters difficulties of precisely focusing or contact printing a high spatial frequency grating (needed for reasonable quality) on the recording film. As a result, low frequency gratings are employed which, in turn, make separation of the diffracted beams more difficult and high quality expensive projector components are required.

Conventional unfocused holography is burdened by an intrinsic background noise due to intermodulation effects of object points at the hologram film. Conventional holograms include a wide spectrum of spatial frequencies, the higher range of which cannot be resolved. The high redundancy in conventional holograms includes much excess information of little value when two-dimensional objects are to be recorded and projected. The need for laser illumination when a hologram is to be projected increases the complexity of a projector.

Known focused or image-plane holography reduces or eliminates the intermodulation noise of conventional holography, but still has a wide spectrum of spatial frequencies to record. Although an extended white-light source may be used to reconstruct such a recorded hologram, the viewed image displays colored bands across the viewing surface.

When color images are to be recorded and subsequently displayed, a need for economic and practical techniques arise. Color film copies of motion pictures for mass distribution are too expensive for the home entertainment market. Each copy must go through the same critical and time consuming chemical processing as the original. The hologram is recognized as a vehicle for transferring color information from objects into signals which may then be recorded on monochrome (black and white) film and duplicated for mass distribution. See, for example, the summary description of a thick-film "Lippmann-Bragg" interference method described in Chapter 7, pp. 173–184 of a book by Howard M. Smith entitled "Principles of Holography" published by Wiley-Interscience 1969 and the description of a holographic recording and TV playback system of the RCA Corporation described in an article entitled "Pressing Pictures on Holographic Tape is Fast, Inexpensive" published in ELECTRONICS of November 10, 1969 at pages 108–114.

The recording of a three-dimensional pattern throughout the depth of a thick photographic emulsion as described in the previously identified book by Howard M. Smith introduces critical process controls to avoid shrinkage or swelling for undistorted recording of information. Such thick-film holograms are difficult to duplicate without a considerable loss of detail and signal to noise ratio. Special techniques must be employed to reduce recording non-linearities and unnaturalness of the color images.

SUMMARY OF THE INVENTION

In the formation of a hologram in accordance with the invention, an object beam of collimated light (parallel light rays) is employed to form a "focused" or "image-plane" hologram on a recording film with a single constant spatial carrier frequency when a single color laser is used or a multiple number of discrete spatial carrier frequencies when multiple colors are used to form a color encoded hologram.

The recorded hologram may be reconstructed by illuminating the recording film with an inexpensive source of generally collimated white light which produces a bundle of diffracted parallel ray beams at different angles relative to the optical axis. A conventional projection lens collects the diffracted beams and focuses them in a viewing plane. Since the collected rays are essentially parallel, they first converge to small spots in the back focal plane of the projection lens before proceeding to a screen for imaging.

A spatial filter in the form of an opaque surface with an aperture is located in the back focal plane of the projection lens to block all light but the portion passing through the aperture. When the aperture is aligned with the converging spot of a desired diffracted beam, such as the beam which is diffracted parallel to the optical axis, a reconstruction is projected on the screen in the viewing plane.

With the addition of a control, the position of the spatial filter in its plane can be varied to select the color of the diffracted beam for projection. In addition, the size of the aperture may be selected to vary the brightness of the image.

The recording and projection of a hologram in accordance with the invention are particularly advantageously adapted for color encoding and decoding. For example, as described herein with respect to a specific embodiment, a multicolor laser beam, which includes three primary colors, is collimated and illuminates an object in the form of a multicolored transparency. The multicolor beam emerging from the transparency is focused by a telecentric lens system on a film which is sensitive to all the colors used. A collimated reference beam, which originates from the same three-color laser, is directed at the film to produce three monochrome holograms which are linearly superimposed upon one another on the film.

After the film has been processed to store the interference patterns, their reconstruction may be conveniently obtained. This reconstruction employs a source of collimated white light, the projection lens system and spatial filter as previously described. The spatial filter may be moved in the focal plane of the projection lens system to select the desired hue of the colors projected on the screen and size control of the aperture size may be varied to select the color saturation of the image.

This color recording and projection has distinct advantages over the described prior art techniques. Thus, the ghost problems produced from thick photographic emulsions are eliminated. Natural appearing colors are produced which are continuously adjustable in both hue and saturation while none of the prior art schemes form images with such color adjustment capability. Furthermore, the recording film may be processed to be replicated in large quantities. Inexpensive, practical projection devices may be produced.

It is, therefore, an object of the invention to provide a method and apparatus for producing and reconstructing holographic images of single or multiple colors.

BRIEF DESCRIPTION OF DRAWINGS

These and other objects and advantages of the invention will be understood from the following description of several embodiments illustrated in the drawings wherein.

DETAILED DESCRIPTION OF EMBODIMENTS

Figure 1:
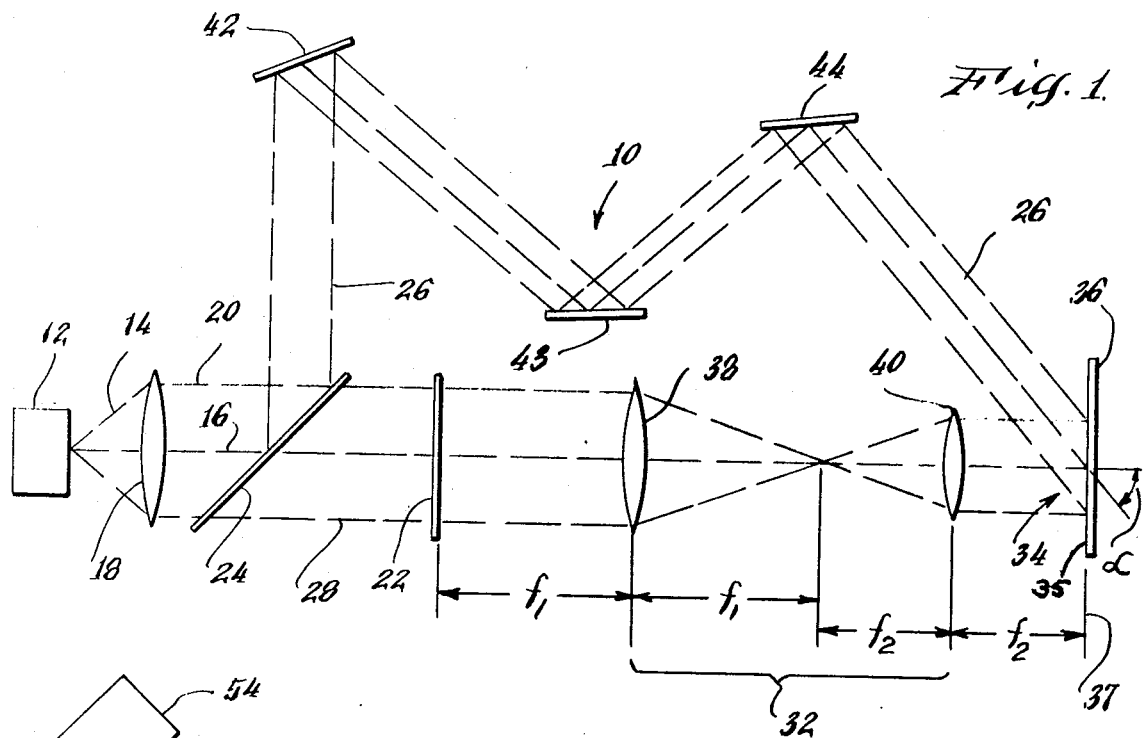
FIG. 1 is a schematic view of a hologram recording apparatus in accordance with the invention.

With reference to FIG. 1, a recording system 10 for a hologram in accordance with the invention is schematically illustrated. A laser 12 of suitable and desired output wavelength provides a beam 14 of coherent illuminating light of wavelength $\lambda_1$ along a common optical axis 16 to a collimating lens 18. A collimated coherent laser light beam 20 having the desired cross-sectional area for illumination of a transparency object 22 is passed through a beam splitter 24 to produce a reference beam 26 and an object illuminating beam 28.

The object illuminating beam 28 is parallel with optical axis 16 and is directed at the black-and-white film transparency object 22. After passing through the transparency object 22, the rays of object beam 28 are spatially modulated by the picture elements of object 22, but are still essentially parallel. The rays from object 22 will deviate within a small angular range from their original direction because of the diffraction effect by the picture elements in object 22.

A telecentric relay lens system 32 produces an image 34 on surface 35 of a recording film 36, The telecentric relay is formed of two lenses 38 and 40 which are arranged to maintain the essentially parallel-ray light distribution from transparency object 22.

Thus, if $f_1$ and $f_2$ are respectively the focal lengths of lens 38 and 40, then the distance between object 22 and lens 38 should be $f_1$, the distance between lenses 38 and 40 should be the sum of $f_1$ and $f_2$ and the distance from lens 40 to the recording film is $f_2$. The magnification or demagnification of image 34 may be selected by choosing the focal lengths of lenses 38 and 40.

The telecentric relay 32 reproduces the overall wavefront in the plane of object 22 onto a distant recording plane 37 at film 36. Hence, the angles of the rays incident upon the plane of the object 22 are reproduced at the recording plate 37. Since the transparency object 22 is illuminated with a collimated beam 28, the telecentric relay 32 will produce an image 34 also with parallel rays. If the second lens 40 has a shorter focal length than lens 38, as shown in FIG. 1, then image 34 will be a demagnification of object 22.

Reference beam 26 is directed with properly oriented mirrors, 42, 43 and 44 at the recording film 36 with a recording angle $\alpha$ with respect to the optical axis 16. Note that in the embodiment of FIG. 1 the object 22, the optical elements of the telecentric relay 32 and the holographic recording film 36 are oriented perpendicular to a common optical axis 16.

In the recording apparatus, care should be taken to use optical components which are as free from optical defects such as chips, dust particles and multiple reflections as possible. Such defects tend to produce interference fringes which are super-imposed with the recorded image on film 36 and should be avoided.

Since the object beam 28 from lens 40 and reference beam 26 are coherent with respect to each other, they interfere and produce a stationary time-averaged interference pattern which is recorded on film 36. Since both beams are essentially plane wavefronts interfering on a plane surface, the interference pattern consists of a series of straight-line fringes oriented perpendicular to the plane of the drawing with a constant spatial carrier frequency across film 36.

The recording film 36 only records a two-dimensional image so that film 36 may be formed of any suitable photosensitive material. For example, photopolymers, a thermoplastic film or regular silverhalide emulsions may be used for recording the hologram image.

Film 36 may be processed to store its interference patterns in a variety of forms such as density (absorption) variations, as index of refraction variations or as surface-relief variations. Surface-relief holograms, such as described in the previously identified Electronics article, have the advantage of being easily and inexpensively replicated in large quantities. Absorption holograms have the disadvantage of a low diffraction efficiency as compared to the other processed hologram forms.

Figure 2:
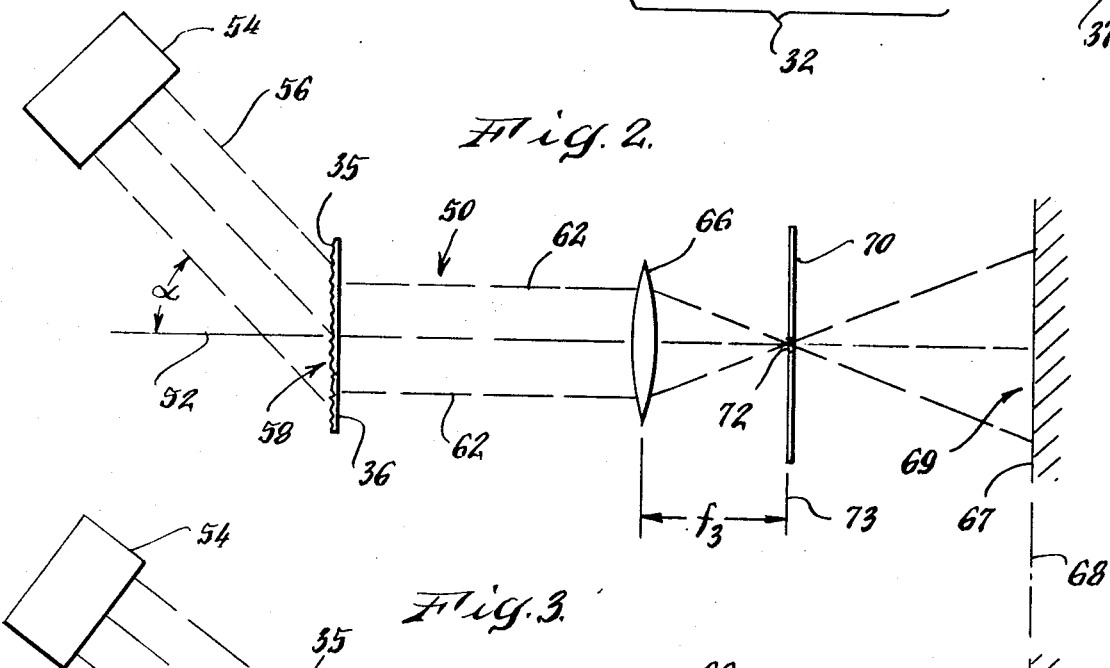
FIG. 2 is a schematic view of a projection apparatus in accordance with the invention for reconstructing the hologram formed with a recording apparatus shown in FIG. 1.

The advantages obtained with the use of parallel object illuminating beam 28 become particularly evident when the processed hologram film is to be viewed. FIG. 2 schematically shows a projector 50 for reconstructing the diffracted wavefront of a processed hologram film 36 of the surface-relief type and mounted perpendicular to a common optical axis 52.

A source 54 of ordinary white light produces a generally collimated illuminating beam 56. Beam 56 is directed at the processed hologram 58 on surface 35. The beam 56 includes light of the same wavelgnth $\lambda_1$, (e.g., yellow-green 550 nm) generated by laser 12 in FIG. 1. The illuminating beam 56 need not be very well collimated for black-and-white imaging. However, good collimation improves the collimation of the reconstructed beam, reduces vignetting problems and facilitates the separation of diffracted and undiffracted beams.

The hologram 58 carries periodic straight-line fringes, which are amplitude modulated by the image distribution, and act upon the illuminating beam 56 just like a diffraction grating. Thus, all colors contained in the illuminating beam 56 from source 54 are diffracted, but at different angles. Hologram 58 thus reconstructs a continuum of similar wavefronts of different colors and in different directions of propagation. However, only those rays 62, which have the same wavelength $\lambda_1$ of laser 12, are diffracted parallel to the optical axis 52. The other colors, such as rays 64 of a wavelgnth $\lambda_2$, such as orange 615 nm shown in FIG. 3, diverge from axis 52 and produce "cross-talk" or "ghost" images.

A projection lens 66 is oriented perpendicular to axis 52. The distances from lens 66 to the hologram 58 and to a projection screen 67 located in a viewing plane 68 are adjusted as in a conventional projector to project an image 69 with the desired magnification. A spatial filter in the form of an opaque stop 70 having an aperture 72 is located in the back focal plane 73 of projection lens 66.

Figure 3:
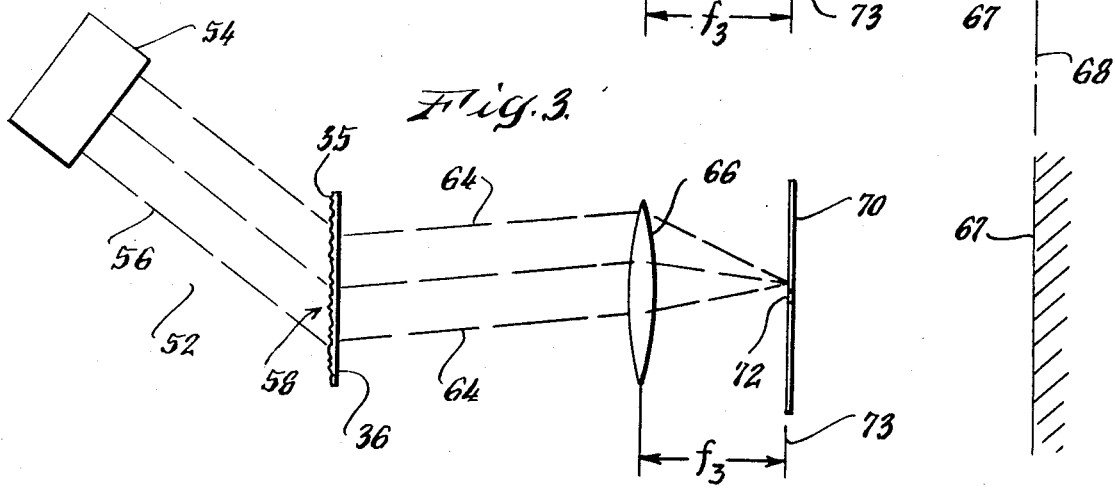
FIG. 3 is a schematic view of the effect of a spatial filter on the projection of an image of undesired wavelength.

With aperture 72 located on axis 52, as shown in FIG. 2, only rays 62, which are parallel to axis 52 are imaged on screen 68. FIG. 3 illustrates rays 64 of a different wavelength, $\lambda_2$ diffracted at an angle to axis 52 and then focused by lens 22 on the opaque segment of spatial filter 70 and thus blocked from screen 68.

Several advantages arise with a holographic recording and projection apparatus as shown in FIGS. 1 and 2. The spatial filter 70 may be moved in plane 73 to align aperture 72 with different rays, such as 64, to provide a change in the color of the image on screen 68. The size of aperture 72 may be adjusted to vary the brightness of image 69. For instance, the movement of the spatial filter 70 to where its aperture 72 passes rays 64 (see FIG. 3) and blocks rays 62 results in an image 69 with the different color. Also, by increasing the size of aperture 72, whereby, for example, both rays 62 and 64 are imaged will increase the brightness of the image. In fact, the multiple imaging of several wavelengths will be more pleasant to view.

Figure 4:
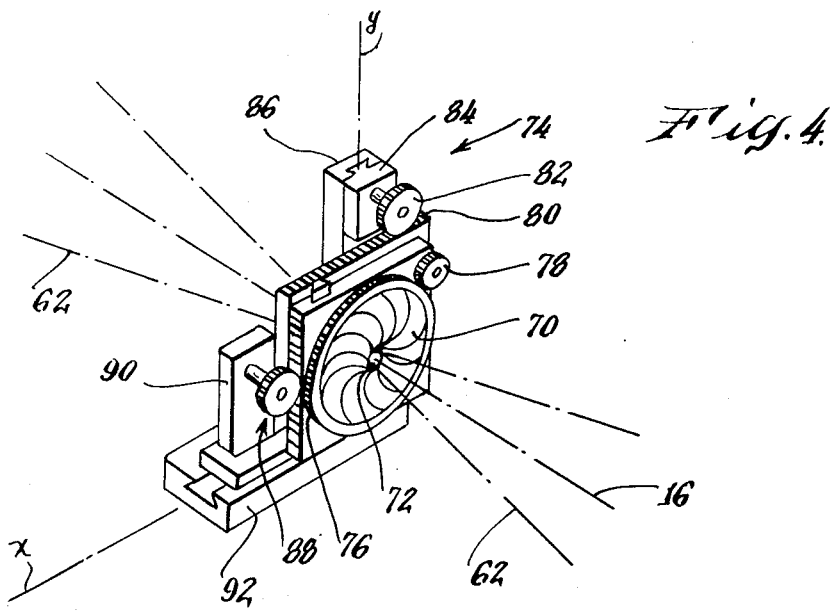
FIG. 4 is a perspective view of an apparatus for controlling the position of a spatial filter in a focal plane.

FIG. 4 schematically illustrates an apparatus 74 for moving and adjusting spatial filter 70 and its aperture 72 in back focal plane 73 of projection lens 66. The spatial filter 70 is of conventional camera aperture-stop design. The aperture 72 may be adjusted in size by rotating a ring 76 under control by a motor (not shown) acting on a drive pinion 78. Alternatively, ring 76 may be manually adjusted.

Movement of spatial filter 70 in plane 73 is obtained with an orthogonal x-y control. Such controls are well-known in the art and the components shown in FIG. 4 are illustrative of such device. X-direction control is obtained with a rack 80 mounted to spatial filter 70 and engaged by a pinion 82. Pinion 82 may be driven by a motor 84 while the entire rack and pinion assembly 80, 82 with motor 84 and spatial filter 70 are mounted for vertical y-directional movement in a correspondingly aligned slide 86. Vertical or y-directional motion is controlled with another rack and pinion assembly 88 and motor 90, and which are mounted for movement along an x-directional slide 92.

The precautions needed in the recording apparatus 10 of FIG. 1 to avoid the superposition of undesired interference fringes from chips, dust particles and the like are not required in the incoherent light projector 50 of FIG. 2. In fact, certain image defects in film 36 as a result of careless hologram recording or film processing may be removed or reduced by adjusting the position of filter 70 or the size of aperture 72.

The light beam 30 from object 22 in FIG. 1 is essentially collimated with but slight dispersion from perfect collimation by the diffraction effect from the picture details in object 22. This essentially collimated object beam produces distinct advantages in that an interference hologram 58 is formed of an easily recorded low frequency spatial carrier. Hence, a greater amount of diffracted light is directed through the projection lens 66 for imaging of the processed hologram 58 on screen 68. The essentially parallel-ray reconstructed wavefront represented by rays 62 further may be focused to a very small focal spot for effective spatial filtering in projector 50.

Figure 5:
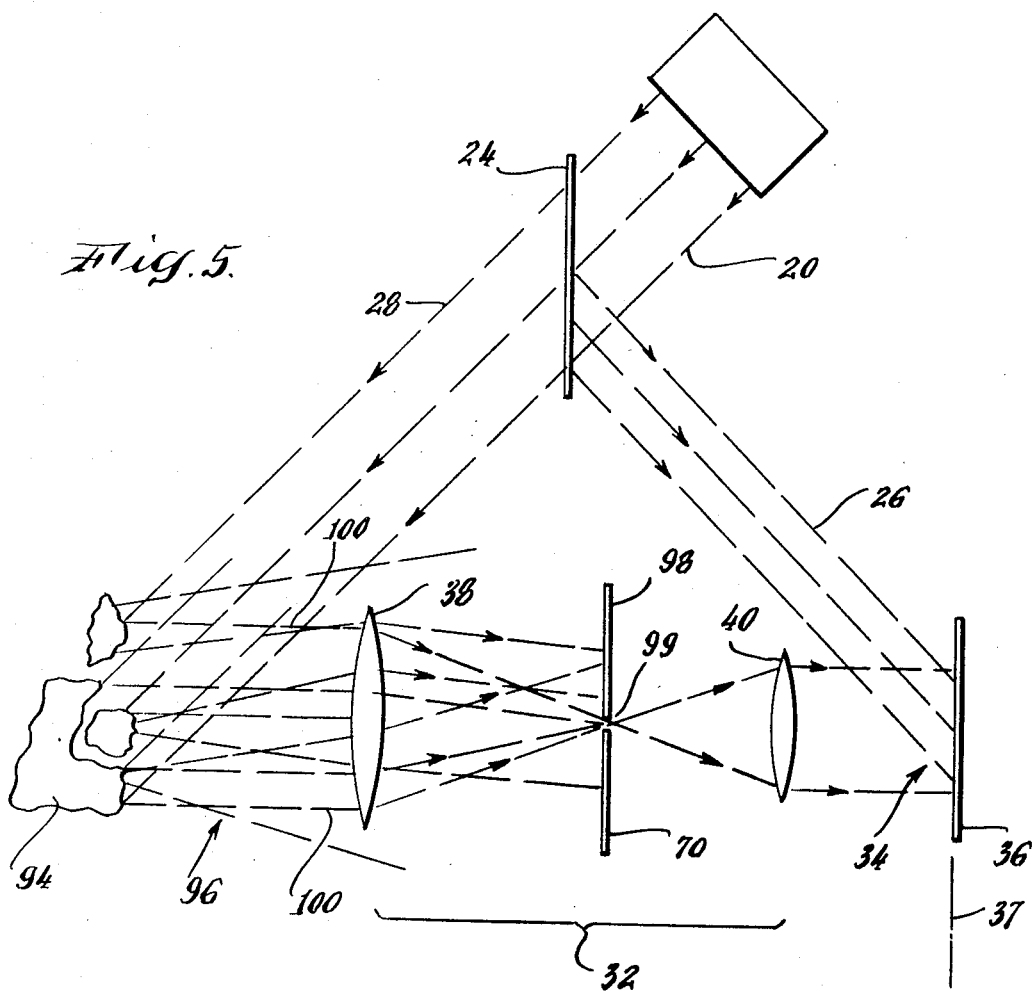
FIG. 5 is a schematic view of a modified hologram recording apparatus in accordance with the invention for recording holograms of diffuse objects or diffusely illuminated objects.

The described apparatus for hologram recording and projection may, however, also be advantageously employed to record diffuse objects or diffusely illuminated objects. When an object 94 such as shown in FIG. 5 is not a clear transparency, but rather has a rough scattering surface or is illuminated by diffuse light, then the object beam 96 will be far from collimated. The recording apparatus of FIG. 1 will then produce a wide spectrum of spatial frequencies causing large diffraction angles and extensive vignetting. A reconstructed wavefront would not, in such case, focus to a point for passage through spatial filter 70 in the projector 50 of FIG. 2. Accordingly, a small-aperture spatial filter 98 (see FIG. 5) is added to the recording apparatus and located as shown in FIG. 5 in the plane where parallel rays 100 are focused to a small spot by the telecentric relay lens 32.

Since most of the light from the object is blocked by spatial filter 98, the illuminating beam 20 must be correspondingly increased in power relative to reference beam 26 to maintain the optimum intensity ratio between the two interfering beams. This relative power adjustment is suggested by the partial application of the reference beam from beam splitter 24. The aperture 99 of spatial filter 98 must be just large enough to pass a sufficient amount of diffracted rays required to produce image detail. Note that spatial filter 98 further increases the depth of focus of the image 34 on film 36, much like the aperture in a photographic camera. In this manner, three-dimensional objects or scenes may be more easily recorded as sharp two-dimensional images.

An important feature of the previously described recording apparatus 10 shown in FIG. 1 and the projector shown in FIG. 2 is the production and projection of color encoded holograms. In such application, laser 12 of FIG. 1 produces three primary colors, red, green and blue, such as may be obtained from a krypton or argon-krypton ion gas laser. The object and reference beams 28 and 26 again originate from the same laser source having been separated by beam splitter 24. Film 36 is sensitive to all the colors used so that each color component may form its own component hologram.

The multicolored beam 14 emanating from laser 12 is collimated with a color-corrected collimating lens 18. The three different colors of laser beam 14 have different frequencies and, therefore, cannot interfere among one another to produce a stationary interference pattern that could be recorded on film 36. Each color in object beam 28 is coherent with the same color in reference beam 26 and produces a set of parallel sinusoidally amplitude modulated fringes on film 36, each set having a spatial carrier frequency proportional to the colors employed. The recorded hologram then consists of three (blue, green and red) component holograms superimposed upon one another. Each component hologram, after processing, is in effect a sinusoidal diffraction grating with a unique spatial frequency (fringe spacing) that is encoded with the intensity of the distribution of a single color in the object.

The color-encoded hologram may be processed in a similar manner as the previously described monochrome hologram. The projection of the color-encoded hologram is accomplished with a projector 50 shown in FIG. 2. The projection lens 66 is color-corrected and the processed color-encoded hologram film 36 exposed to beam 56 of generally collimated white incoherent light.

Each color-encoded component of the hologram 58 diffracts light of all the colors in the illuminating beam 56 but at different angles with respect to optical axis 52. Thus, each hologram component reconstructs a continuum of similar wavefronts of different colors and direction of propagation. However, the red light diffracted by the red-encoded component hologram, the green light diffracted by the green component hologram and the blue light diffracted by the blue-encoded component hologram are the true wave reconstructions whose rays are essentially parallel to optical axis 52. These latter parallel ray reconstructions pass through aperture 72 of spatial filter 70 to produce a properly colored image on screen 68. The "ghost" rays strike spatial filter 70 and are blocked out.

The special nature of the color distribution of the light in the plane of spatial filter 70 provides a convenient basis for adjusting the color of the image projected on screen 68. Each color component hologram disperses all the colors of the illuminating beam at different angles. Hence, the projection lens 66 produces a rainbow-like color distribution on plane 73 for each component hologram. There are three of such color distributions which overlap such that the red segment of one coincides with the green of the second component and the blue of the third component. Each color distribution pattern contains all of the information for its component hologram identically across its entire color spectrum. Thus, if spatial filter aperture 72 is moved off the optical axis 52, such as with an apparatus as shown in FIG. 4, the same three component light distributions will still be projected on screen 68. The distributions, however, will now have different colors from what was originally projected on the screen when aperture 72 was aligned on axis 52.

In this manner, new primary colors may be selected while maintaining the same ratio of wave lengths as the original primary colors, as long as aperture 72 is located within the range of overlap of the three color distribution patterns.

Another adjustment of the colors of the image on screen 68 is obtained by varying the size of aperture 72 by rotating ring 76 in FIG. 4. A larger aperture allows more of the adjacent "ghost" colors through, thus reducing the color saturation in the image while gaining the advantage of more light for a brighter image. A smaller aperture will result in a less bright image, but increases the color saturation up to the full amount recorded in hologram 58. A bright black and white image can even be formed when the aperture is opened so wide that all of the colors in all three color distribution patterns can pass through to image on screen 68.

Under certain conditions, spatial filter 70 need not be used. For example, when the reference beam angle $\alpha$ is small enough and the projection lens is large enough, all colors diffracted by the hologram might be able to pass through the projection lens 66 to form a full black and white picture without spatial filter 70. Care must be exercised to maintain a well-collimated projection beam 56 and keep the recording angle sufficiently small for reasonably low spatial frequencies in the hologram 58.

The recording and projection of color-encoded holograms in accordance with the invention provide practical and simple ways of introducing control over color hue and saturation with automatic registration of the colors. Thus, a film can be produced with a color encoded hologram of the surface-relief type and which may be conveniently replicated. The replicated copies are conveniently displayed with minimum distortion with color controls that impart extensive versatility to the projector.

What is claimed is:

1. A projector for reconstructing a projectable color image-plane hologram recorded on a medium where the color information carrying hologram is formed with color related constant spatial carrier frequencies which are amplitude modulated by a focused image by interfering spatially modulated coherent object light beams including different colors at a recording angle with corresponding reference beams coherent with the object beams comprising means for producing an incoherent beam of generally parallel light and having a light spectrum which includes color wavelengths present in the light of the object beams used to form the hologram, said incoherent beam being directed to illuminate said image-plane hologram on the medium at an angle which is the recording angle which the reference beams make with the spatially modulated coherent object light beams, the intensity of said incoherent beam being selected sufficiently high to enable projection of a reconstructed image in a remote viewing plane, means responsive to generally parallel light rays reconstructed by the hologram along a path which extends generally at the recording angle from the incoherent beam for focusing the generally parallel rays after passage through a focal spot in a viewing plane, a spatial filter formed of an opaque stop having an aperture, said spatial filter being located generally in the plane of the focal spot to form a color projection of aperture selected reconstructed parallel rays in the viewing plane, means for moving the spatial filter within its plane to select reconstructed parallel light rays from the hologram for projection; and means for adjusting the size of the aperture in the spatial filter to control the brightness of the image projected from the hologram.

2. A method for reconstructing and projecting an image-plane color hologram recorded on a transparent medium where the color information carrying hologram on a transparent medium where the color information carrying hologram is formed with color related constant spatial carrying frequencies which are amplitude modulated by a focused image by interfering spatially modulated coherent object light beams including different colors at a recording angle with corresponding reference beams coherent with object beams comprising the steps of directing a generally collimated source of white light upon a hologram recorded on said transparent medium along a direction which the reference beams made with the spatially modulated coherent object light beams, selecting the intensity of the source of white light sufficiently high to enable a projection of a reconstructed image upon a remote viewing plane, focusing parallel rays generally emanating along a path forming a recording angle with the source of white light and reconstructed by the illuminated hologram in the transparent medium in an image in a viewing plane after passing the parallel rays through a focal point in a focal plane, and spatially filtering the rays within the focal plane to project an image of a selected color on the viewing plane by positioning an apertured stop within the focal plane to select a desired color hue for the projected image, and adjusting the size of the aperture in the stop to select the desired brightness of the image.

3. A system for recording and projecting color image-plane holograms comprising means for producing an essentially collimated coherent object light beam formed of different color wavelengths and spatially modulated by an object means for interfering said collimated coherent object light beam in a recording plane at a recording angle with a collimated reference beam coherent with the object beam to form a hologram on a recording medium of a discrete constant spatial carrier frequency, means for illuminating the hologram on a developed recording medium with a collimated beam of incoherent light along an angular direction which the reference beam made with respect to the object light beam and producing separated wavefront reconstructions formed of parallel rays emanating along a path which generally extends at the recording angle from the beam of illuminating incoherent light, means for imaging the parallel rays after passage through focal points in a focal plane on a viewing plane for display, spatial filtering means located in said focal plane to pass selected parallel rays for imaging on the viewing plane with a desired color display, means for moving said spatial filtering means in the focal plane to select the color hue of the projected image on the viewing plane; and means for adjusting the number of rays passed by the spatial filtering means to select the color saturation of the projected image.

* * * * *